US012570261B2

(12) United States Patent
Bussmann et al.

(10) Patent No.: US 12,570,261 B2
(45) Date of Patent: Mar. 10, 2026

(54) HYDRAULIC BRAKE SYSTEM FOR A VEHICLE, VEHICLE, METHOD FOR OPERATING A HYDRAULIC BRAKE SYSTEM FOR A VEHICLE

(71) Applicant: Robert Bosch GmbH, Stuttgart (DE)

(72) Inventors: Otmar Bussmann, Abstatt (DE);
Stefan Hoess, Hessigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 403 days.

(21) Appl. No.: 18/452,118

(22) Filed: Aug. 18, 2023

(65) Prior Publication Data

US 2024/0174209 A1 May 30, 2024

(30) Foreign Application Priority Data

Nov. 30, 2022 (DE) ..................... 10 2022 212 915.6

(51) Int. Cl.
*B60T 13/68* (2006.01)
*B60T 8/92* (2006.01)
(Continued)

(52) U.S. Cl.
CPC .............. *B60T 13/686* (2013.01); *B60T 8/92* (2013.01); *B60T 13/142* (2013.01); *B60T 13/58* (2013.01);
(Continued)

(58) Field of Classification Search
CPC ........ B60T 7/042; B60T 8/176; B60T 8/4081; B60T 8/92; B60T 13/142; B60T 13/145; B60T 13/686; B60T 13/745; B60T 17/18; B60T 17/221; B60T 2270/10; B60T 2270/402; B60T 2270/403
See application file for complete search history.

(56) References Cited

U.S. PATENT DOCUMENTS

2008/0312790 A1* 12/2008 Fey ..................... B60R 21/0132
701/38
2014/0225425 A1* 8/2014 Drumm ................. B60T 13/146
303/9.75
(Continued)

FOREIGN PATENT DOCUMENTS

DE 102015226568 A1 6/2017

*Primary Examiner* — John M Zaleskas
(74) *Attorney, Agent, or Firm* — NORTON ROSE FULBRIGHT US LLP

(57) ABSTRACT

A hydraulic brake system of a vehicle. The hydraulic brake system includes first and second brake circuits, a brake master cylinder hydraulically connected to the first and second brake circuit by a first and second circuit isolation valve, respectively, an activatable pressure generation unit hydraulically connected to the first brake circuit by a first plunger isolation valve and to the second brake circuit by a second plunger isolation valve, and a control unit for activating the circuit isolation valves and the plunger isolation valves. The second circuit isolation valve and the second plunger isolation valve are each electrically connected to a different valve driver of an application-specific integrated circuit of the control unit, and the first circuit isolation valve and the first plunger isolation valve are each electrically connected to different valve drivers, which are independent of the integrated circuit, of the control unit.

11 Claims, 3 Drawing Sheets

(51) Int. Cl.
  _B60T 13/14_          (2006.01)
  _B60T 13/58_          (2006.01)

(52) U.S. Cl.
  CPC ..... *B60T 2270/10* (2013.01); *B60T 2270/402* (2013.01); *B60T 2270/403* (2013.01)

(56)                References Cited

U.S. PATENT DOCUMENTS

| | | | | |
|---|---|---|---|---|
| 2016/0009263 A1* | 1/2016 | Feigel | ................... | B60T 11/224 |
| | | | | 303/15 |
| 2016/0046272 A1* | 2/2016 | Masur | ................... | B60T 13/686 |
| | | | | 60/545 |
| 2016/0272175 A1* | 9/2016 | Ellwein | ................... | B60T 8/885 |
| 2017/0217415 A1* | 8/2017 | Kim | ................... | B60T 13/146 |
| 2018/0015912 A1* | 1/2018 | Foitzik | ................... | B60T 7/042 |
| 2018/0290640 A1* | 10/2018 | Johnson | ............... | B60T 13/662 |
| 2019/0031165 A1* | 1/2019 | Besier | ................... | B60T 8/348 |
| 2019/0100180 A1* | 4/2019 | Park | ................... | B60T 13/662 |
| 2020/0180579 A1* | 6/2020 | Heinz | ................... | B60T 13/662 |
| 2020/0207321 A1* | 7/2020 | Plewnia | ................ | B60T 13/148 |
| 2020/0223415 A1* | 7/2020 | Foerch | ................... | B60T 13/146 |
| 2020/0231132 A1* | 7/2020 | Koerner | ............... | B60T 13/662 |
| 2020/0269826 A1* | 8/2020 | Besier | ................... | B60T 13/686 |
| 2020/0331442 A1* | 10/2020 | Cheon | ................... | B60T 7/042 |
| 2021/0053540 A1* | 2/2021 | Besier | ................... | B60T 13/58 |
| 2021/0269004 A1* | 9/2021 | Krautter | .............. | B60T 13/66 |
| 2021/0300312 A1* | 9/2021 | Krautter | .............. | B60T 17/223 |
| 2022/0135015 A1* | 5/2022 | Haible | ................. | B60T 17/221 |
| | | | | 303/6.01 |
| 2022/0153247 A1* | 5/2022 | Foerch | ................. | B60T 8/4081 |
| 2022/0176931 A1* | 6/2022 | Kim | ................... | B60T 13/662 |
| 2022/0227340 A1* | 7/2022 | Kim | ................... | H02K 7/102 |
| 2022/0242379 A1* | 8/2022 | Kim | ................... | H02P 25/22 |
| 2022/0289161 A1* | 9/2022 | Leiber | ................... | B60T 8/176 |
| 2022/0340112 A1* | 10/2022 | Kim | ................... | B60T 17/22 |
| 2022/0340113 A1* | 10/2022 | Kim | ................... | B60T 8/368 |
| 2022/0348177 A1* | 11/2022 | Foitzik | ................. | B60T 17/223 |
| 2023/0303047 A1* | 9/2023 | Lim | ................... | B60T 13/686 |
| 2024/0359669 A1* | 10/2024 | Zhang | ................... | B60T 8/17 |

* cited by examiner

HYDRAULIC BRAKE SYSTEM FOR A VEHICLE, VEHICLE, METHOD FOR OPERATING A HYDRAULIC BRAKE SYSTEM FOR A VEHICLE

CROSS REFERENCE

The present application claims the benefit under 35 U.S.C. § 119 of German Patent Application No. DE 10 2022 212 915.6 filed on Nov. 30, 2022, which is expressly incorporated herein by reference in its entirety.

FIELD

The present invention relates to a hydraulic brake system for a vehicle, with a first brake circuit and a second brake circuit, with a brake master cylinder which is hydraulically connected to the first brake circuit by a first circuit isolation valve and to the second brake circuit by a second circuit isolation valve, with an activatable pressure generation unit which is hydraulically connected to the first brake circuit by a first plunger isolation valve and to the second brake circuit by a second plunger isolation valve, and with a control unit for activating the circuit isolation valves and the plunger isolation valves.

The present invention moreover relates to a vehicle.

The present invention further relates to a method for operating a hydraulic brake system for a vehicle, with a first brake circuit and a second brake circuit, with a brake master cylinder which is hydraulically connected to the first brake circuit by a first circuit isolation valve and to the second brake circuit by a second circuit isolation valve, with an activatable pressure generation unit which is hydraulically connected to the first brake circuit by a first plunger isolation valve and to the second brake circuit by a second plunger isolation valve.

BACKGROUND INFORMATION

A hydraulic brake system of the above-mentioned type is in German Patent Application No. DE 10 2015 226 568 A1. The brake system is embodied as a dual-circuit brake system and consequently has a first brake circuit and a second brake circuit. The brake circuits are each associated with a plurality of friction braking means. The brake system moreover has a brake master cylinder. The brake master cylinder is embodied as a tandem brake master cylinder and is actuatable by a brake pedal of the brake system. The first brake circuit is hydraulically connected to the brake master cylinder by a first circuit isolation valve. The second brake circuit is hydraulically connected to the brake master cylinder by a second circuit isolation valve. If the first circuit isolation valve is open or conductive, a hydraulic brake pressure in the first brake circuit can be increased by actuating the brake pedal. The same applies to the second brake circuit when the second circuit isolation valve is open. The brake system moreover has an activatable pressure generation unit. The first brake circuit is hydraulically connected to the pressure generation unit by a first plunger isolation valve. The second brake circuit is hydraulically connected to the pressure generation unit by a second plunger isolation valve. If the first plunger isolation valve is open, the hydraulic brake pressure in the first brake circuit can be increased by activating the pressure generation unit. The same applies to the second brake circuit when the second plunger isolation valve is open. The brake system moreover has a control unit which is configured to activate the circuit isolation valves and the plunger isolation valves.

SUMMARY

A hydraulic brake system according to the present invention may have the advantage that, even in the event of malfunction of individual components of the control unit, transition to a purely mechanical fallback level can be avoided. An example embodiment of the present invention provides to this end that the second circuit isolation valve and the second plunger isolation valve are each electrically connected to a different one of the valve drivers of an application-specific integrated circuit of the control unit, and that the first circuit isolation valve and the first plunger isolation valve are each electrically connected to a different one of the valve drivers, which are independent of the circuit, of the control unit. If a valve is electrically connected to a valve driver, the valve can be activated or switched by this valve driver. The use of an application-specific integrated circuit in the control unit is conventional in principle from practice. The split according to the present invention of the various valves between the valve drivers means that a transition to the purely mechanical fallback level can be avoided. Because the first circuit isolation valve and the first plunger isolation valve are electrically connected to valve drivers which are independent of the integrated circuit, the friction braking means associated with the first brake circuit can still be actuated by the pressure generation unit even if the integrated circuit malfunctions. To this end, the first plunger isolation valve is opened and the first circuit isolation valve closed. Fallback to the above-mentioned purely mechanical fallback level is thus avoided because limited assistance can still be provided by the pressure generation unit. If, however, one or both of the valve drivers which are independent of the circuit are affected by a malfunction, the friction braking means associated with the second brake circuit can still be actuated by the pressure generation unit. To this end, the second plunger isolation valve is opened and the second circuit isolation valve closed. In this way too, it is possible to avoid fallback to the above-mentioned purely mechanical fallback level. If a valve is open, it is conductive and hydraulic fluid can consequently flow through it. Fundamentally, the terms "first brake circuit" and "second brake circuit" merely serve to differentiate the two brake circuits from one another conceptually. Preferably, however, the brake master cylinder is configured as a tandem brake master cylinder, the first brake circuit being associated with the primary piston of the tandem brake master cylinder and the second brake circuit with the secondary piston.

A preferred embodiment of the present invention provides that the control unit has a first valve relay and a second valve relay, the first valve relay being associated with the valve drivers which are independent of the integrated circuit, and the second valve relay being associated with the integrated circuit. In a fault scenario, the two valve relays enable separate shutdown of the integrated circuit or of the valve drivers which are independent of the integrated circuit.

A preferred embodiment of the present invention provides that the valve drivers which are independent of the circuit are discrete valve drivers of the control unit. Using discrete valve drivers is accompanied by low costs for providing the control unit.

An alternative embodiment of the present invention preferably provides that the control unit has a further application-specific integrated circuit, and that the further circuit has the valve drivers which are independent of the circuit. At least two integrated circuits are thus present, the integrated circuit and the further integrated circuit. Using the further integrated circuit offers the advantage that, in addition to activating the first circuit isolation valve and the first plunger isolation valve, the further integrated circuit can be used to implement further control functions of the control unit.

According to an example embodiment of the present invention, the integrated circuit preferably has twelve valve drivers. In addition to the circuit isolation valves and plunger isolation valves, a hydraulic brake system typically also has a plurality of further switchable valves. For example, with a total of four friction braking means, there are additionally four inlet valves and four outlet valves present. In addition, the brake system preferably has an isolation valve which is arranged between a hydraulic fluid reservoir and the brake master cylinder. Finally, the brake system preferably has a simulator isolation valve associated with a pedal travel simulator. There are thus preferably precisely fourteen switchable valves present in the brake system. Using an integrated circuit with twelve valve drivers consequently offers the advantage that, apart from the first circuit isolation valve and the first plunger isolation valve, all the remaining valves can each be associated with a different one of the valve drivers of the integrated circuit. In addition, suitable integrated circuits with twelve valve drivers are inexpensively obtainable.

A preferred embodiment of the present invention provides that the valve driver electrically connected to the second circuit isolation valve has switching point detection. Switching point detection enables particularly low-vibration and low-noise switching of the associated second circuit isolation valve. When the friction braking means are not actuated, a hydraulic connection is typically made between the brake circuits and the above-mentioned hydraulic fluid reservoir for pressure equalization. This is often achieved in conventional brake systems by opening both circuit isolation valves. In the brake system according to the present invention, such an approach would possibly be accompanied by an increased generation of vibration and/or noise, in particular when using discrete valve drivers. Pressure equalization can, however, also be achieved by opening the second circuit isolation valve, the first plunger isolation valve and the second plunger isolation valve. The first brake circuit is then hydraulically connected to the hydraulic fluid reservoir by the second brake circuit, such that the first circuit isolation valve need not be opened. Thanks to switching point detection, the second circuit isolation valve can be switched with low vibration and noise, as mentioned above.

A preferred embodiment of the present invention provides that the brake system has a plurality of friction braking means (i.e., arrangement), and that the friction braking means are split between the brake circuits in a black/white split. In a black/white split, friction braking means associated with the same wheel axle are also associated with the same brake circuit. Splitting the friction braking means in a black/white split avoids generating an undesirable yawing moment in the event of failure of one of the brake circuits.

A preferred embodiment of the present invention provides that the control unit is configured to implement an antilock function for the friction braking means associated with the first brake circuit by activating the pressure generation unit. Antilock functions are typically implemented by activating the inlet valves and outlet valves. As mentioned above, the inlet valves and outlet valves are preferably electrically connected to valve drivers of the integrated circuit. In the event of integrated circuit malfunction, it may therefore optionally not be possible to use the inlet valves and outlet valves for implementing antilock functions. Thanks to a suitable configuration of the control unit, an antilock function for the friction braking means associated with the first brake circuit can nevertheless be implemented, in particular independently of the inlet valves and outlet valves. For example, the pressure generation unit has a piston or plunger which is displaceably mounted in a cylinder. The control unit is then configured to activate the pressure generation unit in such a manner that the piston is displaced alternately in opposing sliding directions to implement the antilock function.

A vehicle according to an example embodiment of the present invention includes a hydraulic brake system according to the present invention. The above-mentioned advantages are obtained in this case too. Further preferred features and combinations of features are apparent from the description above.

In a method according to an example embodiment of the present invention, the second circuit isolation valve and the second plunger isolation valve are each activated by a different one of the valve drivers of the same application-specific integrated circuit, and in that the first circuit isolation valve and the first plunger isolation valve are each activated by a different one of the valve drivers which are independent of the integrated circuit. The above-mentioned advantages are obtained in this case too. Further preferred features and combinations of features are apparent from the description above. If the integrated circuit is affected by a malfunction, the first circuit isolation valve is closed and the first plunger isolation valve opened by the valve drivers which are independent of the circuit. The hydraulic brake pressure at least in the first brake circuit can then still be increased by activation of the pressure generation unit. If, however, one or both of the valve drivers which are independent of the circuit are affected by a malfunction, the second circuit isolation valve is closed and the second plunger isolation valve opened by the valve drivers of the integrated circuit. The hydraulic brake pressure at least in the second brake circuit can then still be increased by activation of the pressure generation unit.

A preferred embodiment of the present invention provides that the second circuit isolation valve, the first plunger isolation valve and the second plunger isolation valve are opened and the first circuit isolation valve closed for pressure equalization between a hydraulic fluid reservoir of the brake system and the brake circuits. Performing pressure equalization in this manner is accompanied by particularly little generation of vibration and/or noise. The valve driver associated with the second circuit isolation valve here particularly preferably has switching point detection.

The present invention is explained in greater detail below with reference to the figures.

DETAILED DESCRIPTION OF EXAMPLE EMBODIMENTS

Figure 1:
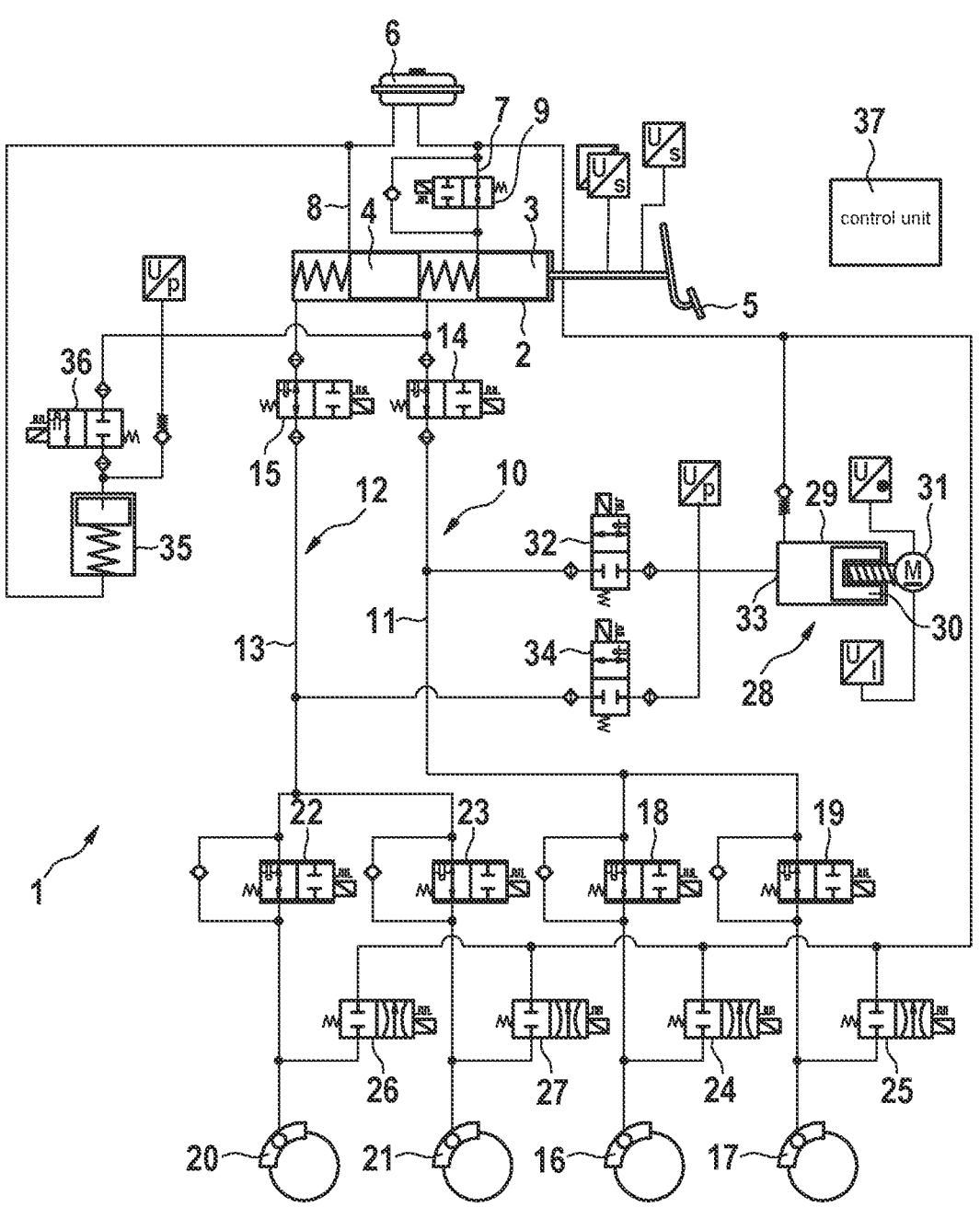
FIG. 1 shows a hydraulic brake system of a vehicle.

FIG. 1 shows a hydraulic brake system 1 of a vehicle which is not shown in greater detail. The brake system 1 has a brake master cylinder 2. In the present case, the brake master cylinder 2 is configured as a tandem brake master cylinder 2 such that a primary piston 3 and a secondary piston 4 are displaceably mounted in the brake master cylinder 2. The primary piston 3 is mechanically coupled to a brake pedal 5 of the brake system 1 in such a way that the primary piston 3 is displaceable by actuation of the brake pedal 5. The secondary piston 4 is in turn coupled to the primary piston 3 coupled in such a way that the secondary piston 4 is displaceable by displacement of the primary piston 3. The brake system 1 moreover has a hydraulic fluid reservoir 6 containing hydraulic fluid or brake fluid. The hydraulic fluid reservoir 6 is hydraulically connected to the brake master cylinder 2 by a first hydraulic line 7 and a second hydraulic line 8. The first hydraulic line 7 includes a switchable isolation valve 9.

The brake system 1 is embodied as a dual-circuit brake system 1 and consequently has a first brake circuit 10 with a first brake circuit line 11 and a second brake circuit 12 with a second brake circuit line 13.

The first brake circuit line 11 is hydraulically connected to the brake master cylinder 2 by a first circuit isolation valve 14. If the first circuit isolation valve 14 is open, hydraulic fluid can be displaced from the brake master cylinder 2 into the first brake circuit line 11 by actuation of the brake pedal 5 in order to increase the hydraulic pressure in the first brake circuit line 11. If the first circuit isolation valve 14 is closed, the hydraulic connection between the brake master cylinder 2 and the first brake circuit line 11 is interrupted. In the present case, the first brake circuit 10 is associated with the primary piston 3. To this end, the first brake circuit line 11 is hydraulically connected to the brake master cylinder 2 between the primary piston 3 and the secondary piston 4.

The second brake circuit line 13 is hydraulically connected to the brake master cylinder 2 by a second circuit isolation valve 15. If the second circuit isolation valve 15 is open, hydraulic fluid can be displaced from the brake master cylinder 2 into the second brake circuit line 13 by actuation of the brake pedal 5 in order to increase the hydraulic pressure in the second brake circuit line 13. If the second circuit isolation valve 15 is closed, the hydraulic connection between the brake master cylinder 2 and the second brake circuit line 13 is interrupted. In the present case, the second brake circuit 12 is associated with the secondary piston 4. To this end, the second brake circuit line 13 is hydraulically connected to the brake master cylinder 2 on a side of the secondary piston 4 remote from the primary piston 3.

First friction braking means 16 and second friction braking means 17 of the brake system 1 are associated with the first brake circuit 10. The first friction braking means 16 is hydraulically connected to the first brake circuit line 11 by a first inlet valve 18. The second friction braking means 17 is hydraulically connected to the first brake circuit line 11 by a second inlet valve 19. A third friction braking means 20 and a fourth friction braking means 21 are associated with the second brake circuit 12. The third friction braking means 20 is hydraulically connected to the second brake circuit line 13 by a third inlet valve 22. The fourth friction braking means 21 is hydraulically connected to the second brake circuit line 13 by a fourth inlet valve 23. If inlet valves 18, 19, 22, and 23 are open, friction braking means 16, 17, 20, and 21 can be actuated by increasing the hydraulic pressure in brake circuit lines 11 and 13. Hydraulic fluid is then displaced into slave cylinders of the friction braking means 16, 17, 20, and 21. If, in contrast, inlet valves 18, 19, 22, and 23 are closed, the hydraulic connection between brake circuit lines 11 and 13 on the one hand and friction braking means 16, 17, 20, and 21 on the other is interrupted. A different outlet valve 24, 25, 26, or 27 is moreover in each case associated with each of friction braking means 16, 17, 20, and 21. The friction braking means 16, 17, 20, and 21 are hydraulically connected to hydraulic fluid reservoir 6 by outlet valves 24, 25, 26, and 27.

Friction braking means (i.e., arrangements) 16, 17, 20, and 21 are split between brake circuits 10 and 12 in a black/white split. In the present case, friction braking means 16 and 17 are associated with the wheels of the vehicle's front wheel axle. Friction braking means 20 and 21 are associated with the wheels of the vehicle's rear wheel axle. According to a further exemplary embodiment, friction braking means 16, 17, 20, and 21 are split between brake circuits 10 and 12 in an X split.

The brake system 1 moreover has an activatable pressure generation unit 28. The pressure generation unit 28 is designed as a plunger system and consequently has a piston 30 in the form of a plunger 30, which is displaceably mounted in a cylinder 29. The reservoir 6 is preferably embodied with three chambers, with brake circuits 10 and 12 and piston 30 each being connected to a different one of the chambers.

The piston 30 is displaceable by an electric motor 31. The first brake circuit line 11 is hydraulically connected to a pressure side 33 of the pressure generation unit 28 by a first plunger isolation valve 32. If the first plunger isolation valve 32 is open, the hydraulic pressure in the first brake circuit line 11 can be increased by the pressure generation unit 28. Friction braking means 16 and 17 are thus also actuatable by the pressure generation unit 28. If the first plunger isolation valve 32 is closed, the hydraulic connection between the first brake circuit line 11 and the pressure generation unit 28 is interrupted. The second brake circuit line 13 is hydraulically connected to the pressure side 33 of the pressure generation unit 28 by a second plunger isolation valve 34. If the second plunger isolation valve 34 is open, the hydraulic pressure in the second brake circuit line 13 can be increased by the pressure generation unit 28. Friction braking means 20 and 21 are thus also actuatable by the pressure generation unit 28. If the second plunger isolation valve 34 is closed, the hydraulic connection between the second brake circuit line 13 and the pressure generation unit 28 is interrupted.

The brake system 1 moreover has a pedal travel simulator 35. The pedal travel simulator 35 is hydraulically connected to the brake master cylinder 2 by a simulator isolation valve 36.

Figure 2:
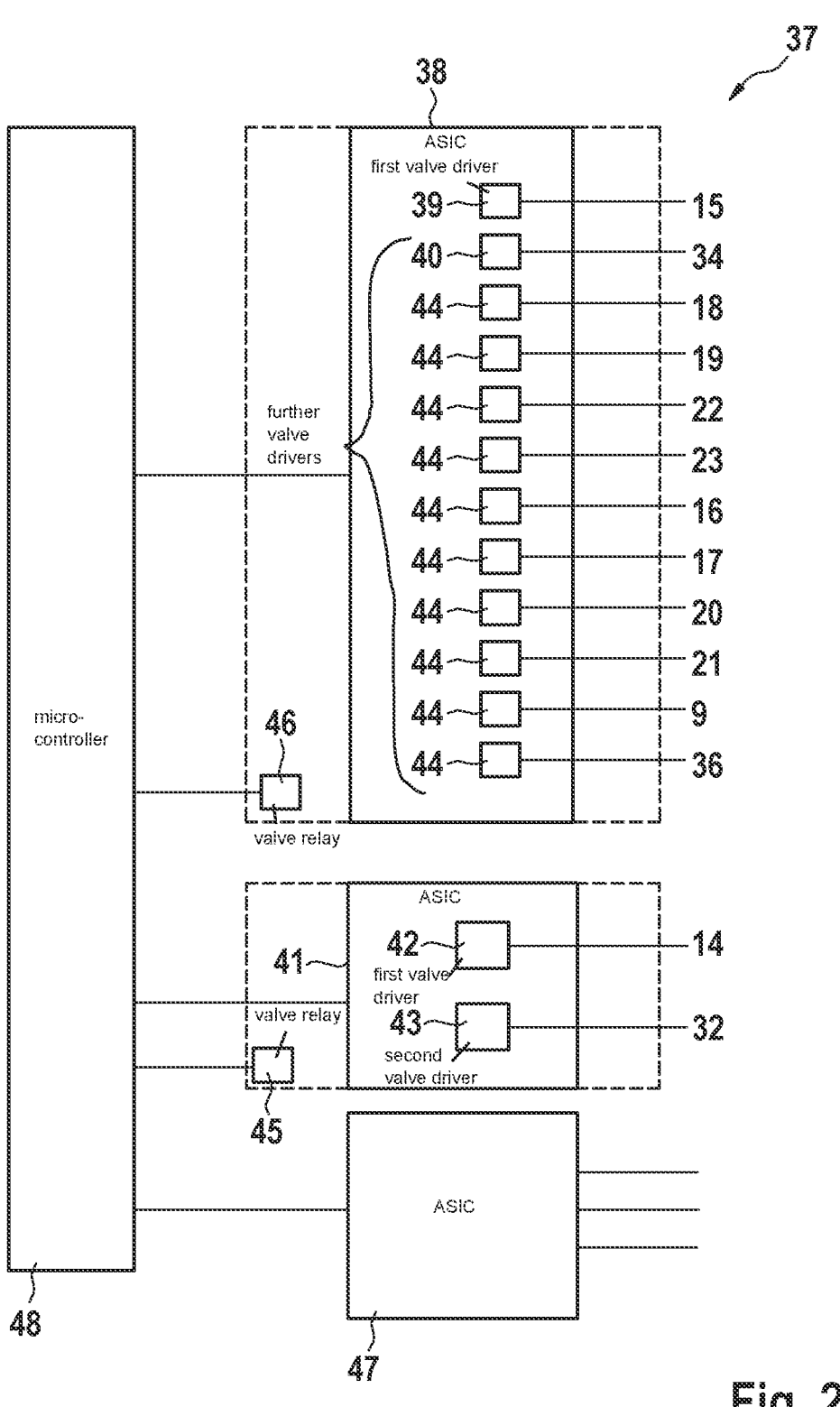
FIG. 2 shows a control unit of the brake system according to an example embodiment of the present invention.

The brake system 1 moreover has a control unit 37. The control unit 37 is configured to activate valves 9, 14, 15, 18, 19, 22, 23, 24, 25, 26, 27, 32, 34, and 36. In the present case, the control unit 37 is additionally configured to activate the electric motor 31. The configuration of control unit 37 is explained in greater detail below with reference to FIG. 2.

The control unit 37 has an application-specific integrated circuit 38 with a plurality of valve drivers. The second circuit isolation valve 15 is electrically connected to a first valve driver 39 of integrated circuit 38. The second plunger isolation valve 34 is electrically connected to a second valve driver 40 of integrated circuit 38. In the exemplary embodiment shown in FIG. 2, the control unit 37 moreover has a further application-specific integrated circuit 41 with a plurality of valve drivers. The first circuit isolation valve 14 is electrically connected to a first valve driver 42 of further integrated circuit 41. The first plunger isolation valve 32 is electrically connected to a second valve driver 43 of further integrated circuit 41. The first circuit isolation valve 14 and the first plunger isolation valve 32 are thus electrically connected to valve drivers 42 and 43 which are independent of integrated circuit 38.

The above-described split of circuit isolation valves 14 and 15 and plunger isolation valves 32 and 34 between the various valve drivers has the advantage that transition to a purely mechanical fallback level can be avoided despite various malfunctions of the control unit 37. If, for example, integrated circuit 38 is affected by a malfunction, the second plunger isolation valve 34 is closed and the second circuit isolation valve 15 opened. The hydraulic pressure in the second brake circuit line 13 can then no longer be increased by the pressure generation unit 28. The hydraulic pressure in the first brake circuit line 11 can, however, still be increased by the pressure generation unit 28. To this end, the first circuit isolation valve 14 is then closed and the first plunger isolation valve 32 opened. Friction braking means 16 and 17 associated with the front wheel axle can then be actuated by pressure generation unit 28. If, in contrast, the further integrated circuit is affected by a malfunction, the first plunger isolation valve 32 is closed and the first circuit isolation valve 14 opened. The hydraulic pressure in the first brake circuit line 11 can then no longer be increased by the pressure generation unit 28. The hydraulic pressure in the second brake circuit line 13 can, however, still be increased by the pressure generation unit 28. To this end, the second circuit isolation valve 15 is then closed and the second plunger isolation valve 24 opened. Friction braking means 20 and 21 associated with the rear wheel axle can then be actuated by pressure generation unit 28.

When friction braking means 16, 17, 20, and 21 are not actuated, a hydraulic connection is preferably made between brake circuits 10 and 12 and hydraulic fluid reservoir 6 for pressure equalization. This is often achieved in conventional brake systems by opening both circuit isolation valves 14 and 15. However, in the light of the above-described split of circuit isolation valves 14 and 15 between the valve drivers, such an approach would possibly be accompanied by increased generation of vibration and/or noise. Pressure equalization is therefore preferably achieved by opening the first plunger isolation valve 32, the second plunger isolation valve 34 and the second circuit isolation valve 15. The first circuit valve 14 is or remains closed. The second brake circuit line 13 is then directly hydraulically connected to hydraulic fluid reservoir 6. The first brake circuit line is 11 hydraulically connected to the hydraulic fluid reservoir 6 by the second brake circuit line 13. The first valve driver 39 associated with the second circuit isolation valve 15 preferably has switching point detection. Particularly low-vibration and low-noise switching of the second circuit isolation valve 15 can be achieved as a result.

In addition to valve drivers 39 and 40, integrated circuit 38 also has a plurality of further valve drivers 44. A total of twelve valve drivers 39, 40, and 44 are present in integrated circuit 38. Isolation valve 9, inlet valves 18, 19, 22, and 23, outlet valves 24, 25, 26, and 27 and simulator isolation valve 36 are each electrically connected to a different one of valve drivers 44. Apart from the first circuit isolation valve 14 and the first plunger isolation valve 32, all the valves of the brake system 1 are thus activated by the integrated circuit 38.

Antilock functions are typically implemented by activating inlet valves 18, 19, 22, and 23 and outlet valves 24, 25, 26, and 27. Because inlet valves 18, 19, 22, and 23 and outlet valves 24, 25, 26, and 27 are activated by the integrated circuit 38, such antilock functions cannot be performed in the event of a malfunction of integrated circuit 38. Control unit 37 is preferably configured to implement an antilock function for friction braking means 16 and 17 associated with the first brake circuit 10 by activating pressure generation unit 28 or electric motor 31. For example, control unit 37 to this end activates electric motor 31 such that piston 30 is displaced alternately in opposing sliding directions. A kind of cadence braking is implemented as a result.

Control unit 37 moreover has a first valve relay 45 and a second valve relay 46. Valve relays 45 and 46 enable separate shutdown of integrated circuit 38 and the further integrated circuit 41, for example in a fault scenario of one of integrated circuits 38 or 41. The first valve relay 45 is to this end associated with the further integrated circuit 41. The second valve relay 46 is associated with integrated circuit 38.

Control unit 37 moreover has a third application-specific integrated circuit 47. The third integrated circuit 47 is configured to activate the electric motor 31. Integrated circuits 38, 41, and 47 are electrically connected to a common microcontroller 48 of control unit 37.

Figure 3:
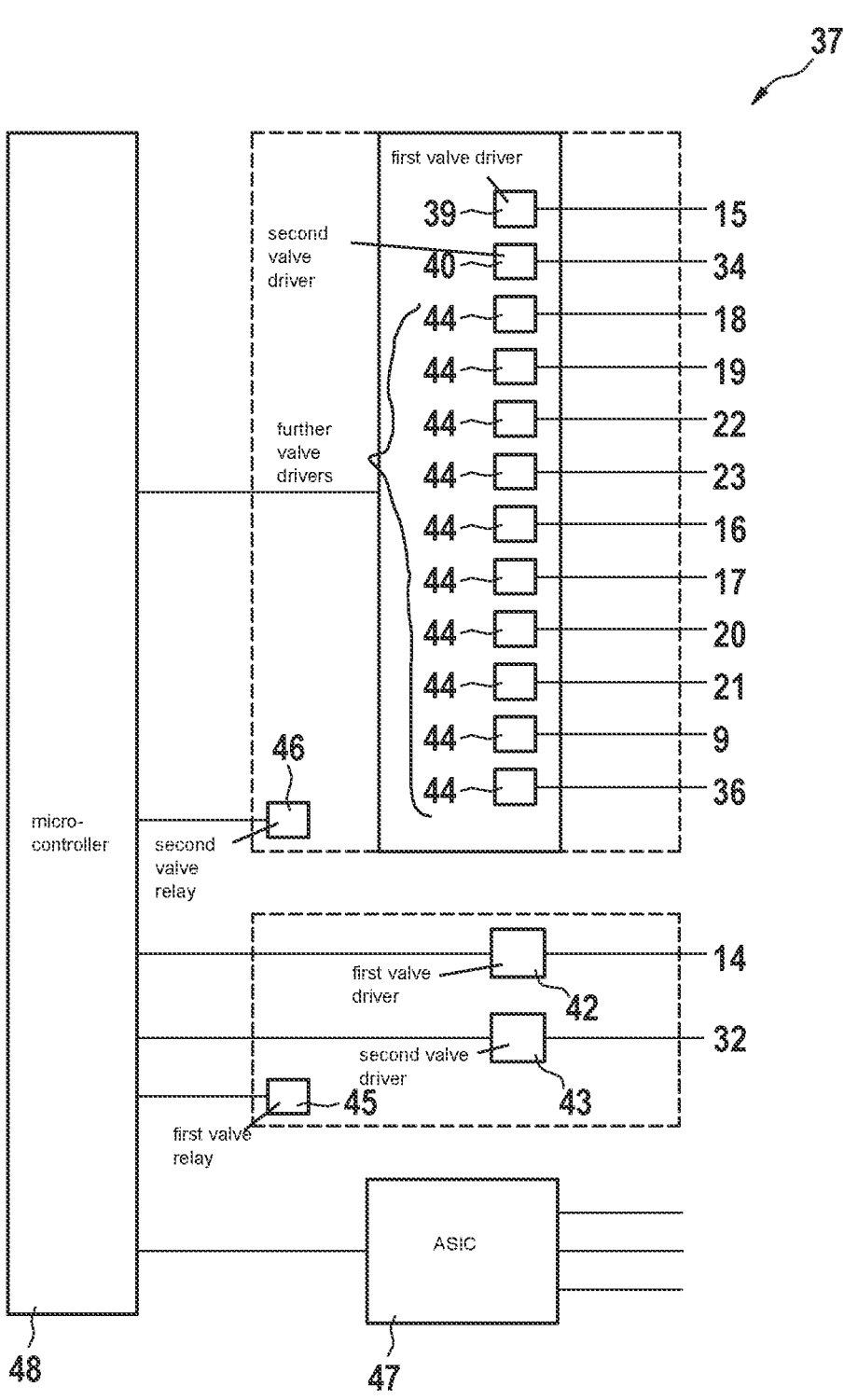
FIG. 3 shows a further exemplary embodiment of the control unit, according to the present invention.

FIG. 3 shows a further exemplary embodiment of control unit 37. The further integrated circuit 41 is omitted from the exemplary embodiment shown in FIG. 3. In this exemplary embodiment, valve drivers 42 and 43 which are independent of integrated circuit 38 are discrete valve drivers 42 and 43 of control unit 37.

What is claimed is:

1. A hydraulic brake system for a vehicle, the hydraulic brake system comprising:
a first brake circuit;
a second brake circuit;
a brake master cylinder hydraulically connected to the first brake circuit by a first circuit isolation valve and to the second brake circuit by a second circuit isolation valve;
an activatable pressure generation unit hydraulically connected to the first brake circuit by a first plunger isolation valve and to the second brake circuit by a second plunger isolation valve; and
a control unit configured to activate the first and second circuit isolation valves and the first and second plunger isolation valves;
wherein the second circuit isolation valve and the second plunger isolation valve are each electrically connected to a different valve driver of an application-specific integrated circuit of the control unit; and
wherein the first circuit isolation valve and the first plunger isolation valve are each electrically connected to a different one of valve drivers which are independent of the integrated circuit of the control unit.

2. The hydraulic brake system as recited in claim 1, wherein the control unit has a first valve relay and a second valve relay, the first valve relay being associated with the valve drivers which are independent of the integrated circuit, and the second valve relay being associated with the integrated circuit.

3. The hydraulic brake system as recited in claim 1, wherein the valve drivers which are independent of the integrated circuit are discrete valve drivers of the control unit.

4. The hydraulic brake system as recited in claim 1, wherein the control unit includes a further application-specific integrated circuit, and wherein the further integrated circuit has valve drivers which are independent of the integrated circuit.

5. The hydraulic brake system as recited in claim 1, wherein the integrated circuit has twelve valve drivers.

6. The hydraulic brake system as recited in claim 1, wherein the valve driver electrically connected to the second circuit isolation valve has switching point detection.

7. The hydraulic brake system as recited in claim 1, wherein the brake system has a plurality of friction braking arrangements, and wherein the friction braking arrangements are split between the first and second brake circuits in a black/white split.

8. The hydraulic brake system as recited in claim 7, wherein the control unit is configured to implement an antilock function for the friction braking arrangements associated with the first brake circuit by activating the pressure generation unit.

9. A vehicle, comprising:

a hydraulic brake system for a vehicle, the hydraulic brake system including:

a first brake circuit, a second brake circuit, a brake master cylinder hydraulically connected to the first brake circuit by a first circuit isolation valve and to the second brake circuit by a second circuit isolation valve, an activatable pressure generation unit hydraulically connected to the first brake circuit by a first plunger isolation valve and to the second brake circuit by a second plunger isolation valve, and a control unit configured to activate the first and second circuit isolation valves and the first and second plunger isolation valves;

wherein the second circuit isolation valve and the second plunger isolation valve are each electrically connected to a different valve driver of an application-specific integrated circuit of the control unit, and wherein the first circuit isolation valve and the first plunger isolation valve are each electrically connected to a different one of valve drivers which are independent of the integrated circuit of the control unit.

10. A method for operating a hydraulic brake system of a vehicle, the hydraulic brake system including a first brake circuit, a second brake circuit, a brake master cylinder hydraulically connected to the first brake circuit by a first circuit isolation valve and to the second brake circuit by a second circuit isolation valve, an activatable pressure generation unit hydraulically connected to the first brake circuit by a first plunger isolation valve and to the second brake circuit by a second plunger isolation valve, the method comprising:

activating each of the second circuit isolation valve and the second plunger isolation valve by a different valve driver of the same application-specific integrated circuit; and activating each of the first circuit isolation valve and the first plunger isolation valve by a different valve driver which are independent of the integrated circuit.

11. The method as recited in claim 10, wherein the second circuit isolation valve, the first plunger isolation valve, and the second plunger isolation valve are opened and the first circuit isolation valve are closed for pressure equalization between the first and second brake circuits and a hydraulic fluid reservoir of the brake system.

* * * * *